US011288334B2

(12) United States Patent
Gupta et al.

(10) Patent No.: US 11,288,334 B2
(45) Date of Patent: Mar. 29, 2022

(54) CONTENT AGNOSTIC QUALITY ESTIMATION AND TOPIC MODELING

(71) Applicant: Microsoft Technology Licensing, LLC, Redmond, WA (US)

(72) Inventors: Somya Gupta, Bengaluru (IN); Srinivasa Madhava Phaneendra Angara, Bengaluru (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 73 days.

(21) Appl. No.: 16/747,162

(22) Filed: Jan. 20, 2020

(65) Prior Publication Data

US 2021/0224343 A1 Jul. 22, 2021

(51) Int. Cl.
*G06F 16/9535* (2019.01)
*G06Q 50/00* (2012.01)
*G06F 40/30* (2020.01)
*G06F 40/279* (2020.01)
*H04L 51/00* (2022.01)
*H04L 67/306* (2022.01)
*H04L 67/50* (2022.01)
*H04L 12/58* (2006.01)
*H04L 29/08* (2006.01)

(52) U.S. Cl.
CPC ........ *G06F 16/9535* (2019.01); *G06F 40/279* (2020.01); *G06F 40/30* (2020.01); *G06Q 50/01* (2013.01); *H04L 51/12* (2013.01); *H04L 67/22* (2013.01); *H04L 67/306* (2013.01)

(58) Field of Classification Search
CPC ...... G06F 16/9535; G06F 40/30; G06Q 50/01
USPC ........................................................ 709/206
See application file for complete search history.

(56) References Cited

U.S. PATENT DOCUMENTS

| 9,959,412 | B2 | 5/2018 | Strauss et al. | |
|---|---|---|---|---|
| 2013/0254206 | A1* | 9/2013 | Counts | G06F 16/3331 707/738 |
| 2013/0268597 | A1* | 10/2013 | van Hoff | G06F 16/3322 709/204 |
| 2016/0012053 | A1* | 1/2016 | Weening | G06Q 10/107 707/723 |
| 2016/0092576 | A1* | 3/2016 | Quercia | G06Q 30/0631 707/734 |
| 2020/0104738 | A1* | 4/2020 | Williams | G06F 16/955 |

OTHER PUBLICATIONS

"Identifying Relevant Social Media Content: Leveraging Information Diversity and User Cognition", Choudhury et al., HT '11: Proceedings of the 22nd ACM conference on Hypertext and hypermedia, Jun. 2011, pp. 161-170. (Year: 2011).*

(Continued)

*Primary Examiner* — Minh Chau Nguyen
*Assistant Examiner* — Jonathan A Sparks
(74) *Attorney, Agent, or Firm* — Schwegman Lundberg & Woessner, P.A.

(57) ABSTRACT

In an example embodiment, a content agnostic approach to quality of assessment of social media posts or other items or content in an online network, such as a social networking service, is utilized. Specifically, information about members contained in member profiles may be used to derive meaningful insights about posts they interact with collectively.

20 Claims, 7 Drawing Sheets

(56) References Cited

OTHER PUBLICATIONS

Fiebig et al., "The Generalized Multinomial Logit Model: Accounting for Scale and Coefficient Heterogeneity", Marketing Science, Articles in Advance, pp. 1-29. (Year: 2009).*

Bache, et al., "Text-Based Measures of Document Diversity", In Proceedings of the 19th ACM SIGKDD International Conference on Knowledge Discovery and Data Mining, Aug. 11, 2013, 9 Pages.

Summers, et al., "Methodology for Measuring Diversity in Human Populations", In Journal of Cultural Diversity, vol. 18, Issue 2, Jun. 1, 2011, pp. 43-47.

* cited by examiner

US 11,288,334 B2

CONTENT AGNOSTIC QUALITY ESTIMATION AND TOPIC MODELING

TECHNICAL FIELD

The present disclosure generally relates to technical problems encountered in presentation of social media posts in computer networks. More specifically, the present disclosure relates to content agnostic quality estimation and topic modeling.

BACKGROUND

The rise of the Internet has occasioned two disparate yet related phenomena: the increase in the presence of social networking services, with their corresponding member profiles visible to large numbers of people, and the increase in the use of these social networking services to provide content. An example of such content is a social media post, where a member can post information, such as text, pictures, videos, articles, etc. for other members to view.

These social media posts can be presented to members in a number of different ways. One way is to present one or more posts in a "feed", which is a listing of posts, typically in reverse chronological order. Traditionally, the social media posts presented in a member's feed were all social media posts that were posted by members "linked" to the member (called "friended" in some social networking services). Presenting all such social media posts, however, can cause a member to be overwhelmed by the sheer number of social media posts, especially when the member has many linked or friended members and/or there are a large number of smaller updates provided by linked or friended members.

While efforts have been made to restrict the social media posts displayed in such feeds, these efforts have traditionally involved providing a score for each social media post based on the post's quality and/or relevance. This score is computed based on the content of the post itself. A post then is prevented from being displayed if its corresponding score is less than some preset threshold.

This type of content-based quality estimation can cause problems, however, in situations where the context of the content is as important as, or even more important than, the content itself. For example, a post about politics may be perfectly relevant if posted in a group dedicated to discussing politics, but may not be relevant if posted in a group dedicated to discussing baseball. Thus, regardless of how high "quality" the post itself is, the context of the post is actually more important than the content of the post.

BRIEF DESCRIPTION OF THE DRAWINGS

Some embodiments of the technology are illustrated, by way of example and not limitation, in the figures of the accompanying drawings.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a content agnostic approach to quality of assessment of social media posts or other items in a social networking service is utilized. Specifically, information about members contained in member profiles may be used to derive meaningful insights about posts they interact with collectively.

In an example embodiment, a "wisdom of crowd" approach is used to evaluate the quality of a post. If members with a vast diversity in skills are engaging with a post, there is a very high likelihood that the post is generic. Thus, diversity of member skills is inversely proportional to the specificity and quality of a post with respect to a certain topic. Therefore, in an example embodiment, a heterogeneity score is computed to aid in the determination of a quality score for a piece of content, such as a social media post. Additionally, in an example embodiment, topic modeling for the pieces of content can be performed using salient member attributes, such as skills and work titles.

Figure 1:
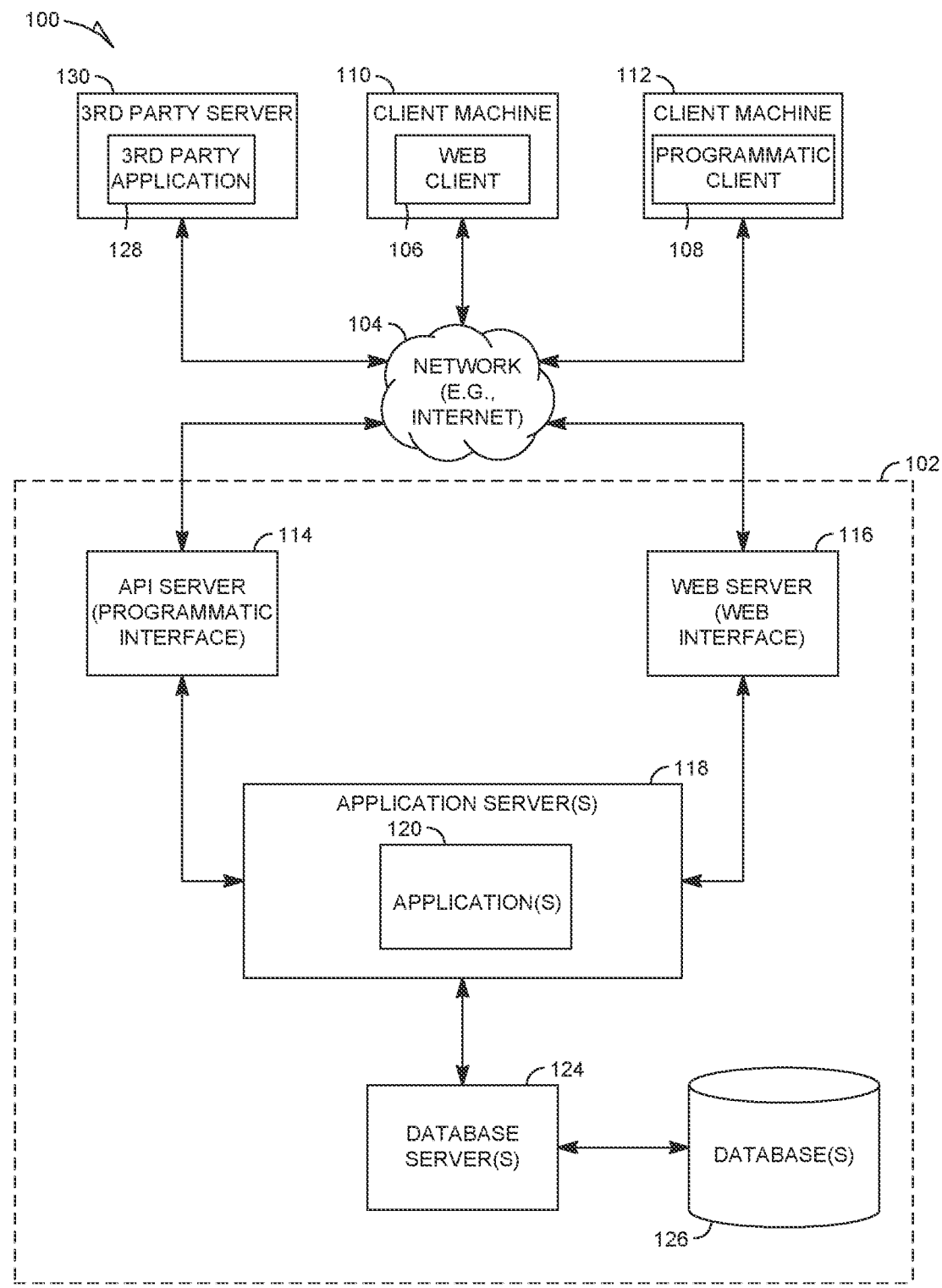
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any web site referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
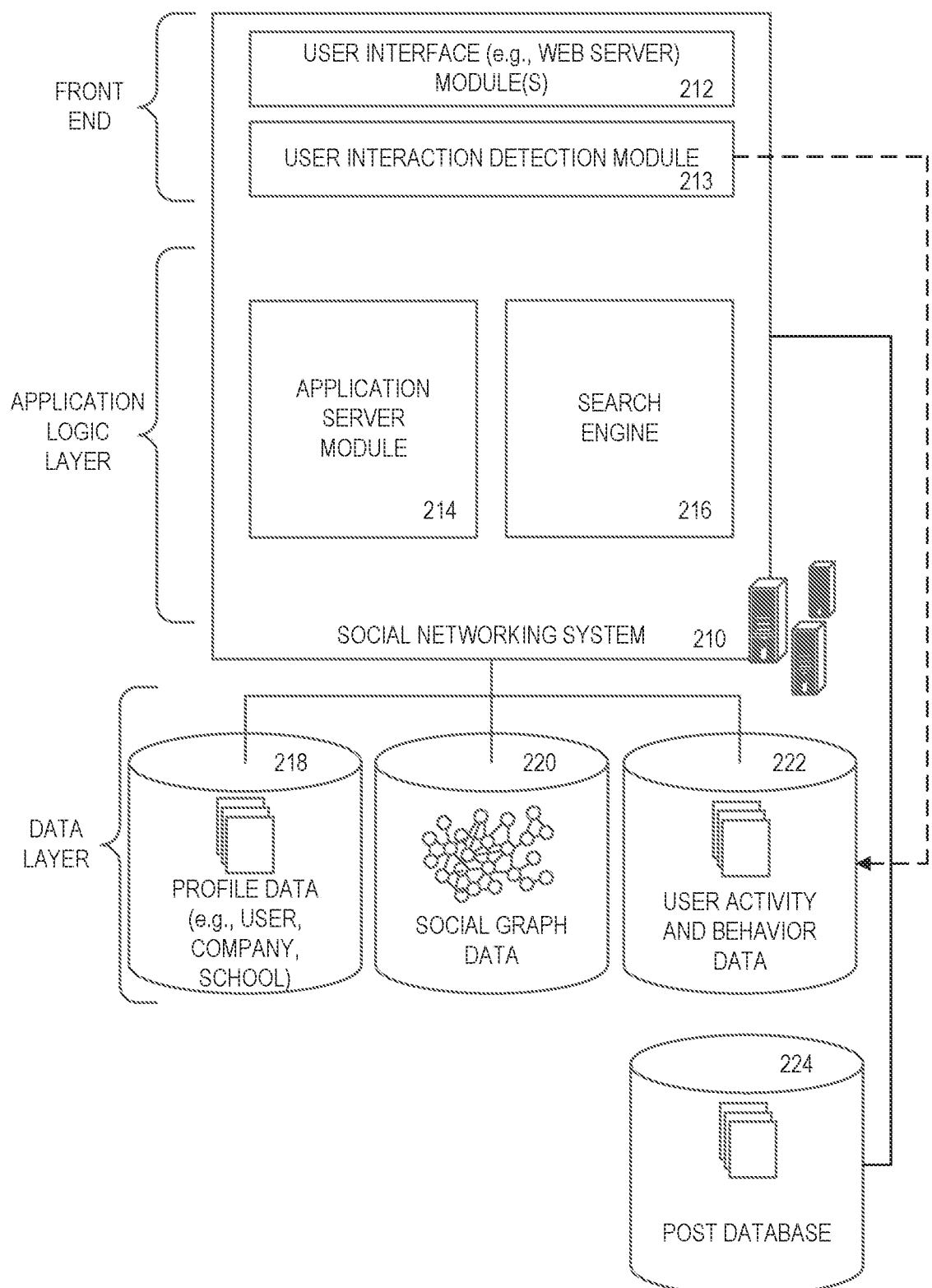
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that members have with different applications 120, services, and content presented. As shown in FIG. 2, upon detecting a particular interaction, the user interaction detection module 213 logs the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a user may invite other members, or be invited by other members, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application may be able to request and/or receive one or more recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

As described above, embodiments of the present invention may be utilized for ranking and/or selection of social media posts to display to members. These social media posts may be directly or indirectly generated from member activity within the social networking service, and may be stored in post database 224. Examples of social media posts directly generated from member activity include the member themselves posting text, image, or video information as a post. Examples of social media posts indirectly generated from member activity include the social networking service itself generating the post when the member has a change in their profile, or when the member is mentioned in an article, etc.

Figure 3:
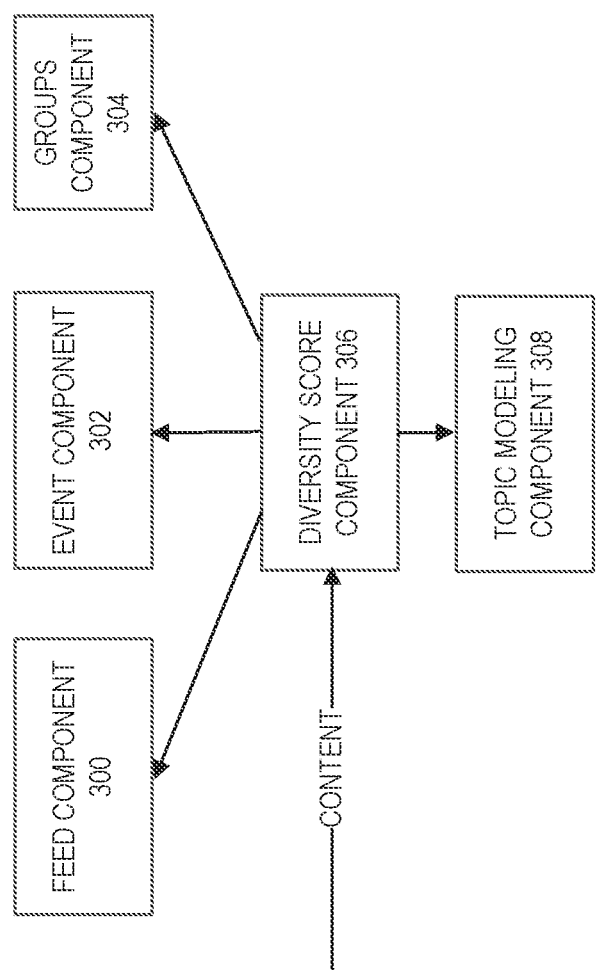
FIG. 3 is a block diagram illustrating an application server module of FIG. 2 in more detail, in accordance with an example embodiment.

FIG. 3 is a block diagram illustrating application server module 214 of FIG. 2 in more detail, in accordance with an example embodiment. While in many embodiments the application server module 214 will contain many subcomponents used to perform various different actions within the social networking system 210, in FIG. 3 only those components that are relevant to the present disclosure are depicted.

A feed component 300 acts to obtain various content to display in member feeds. Each member feed is typically displayed on a home page for the member (the first page or screen the user sees after logging in) and is displayed without regard for whether or not the user is actively searching for such content (i.e., not in response to a search query from the member).

An event component 302 acts to obtain various events to display to various members. An event in this context is a real-world future occurrence that members may be interested in participating in, such as a conference, gathering, party, etc.

A group component 304 acts to organize social media posts into groups that members may participate in. Each group may, for example, be devoted to particular topics, though in some circumstances other common attributes are used to form a group, such as shared locations, backgrounds, etc. The group component 304 then determines which social media posts to display to members who have subscribed to the group.

Notably, while each of the feed component 300, event component 302, and groups component 304 have different purposes, they all share the common trait that they could benefit from having a quality score made available to them for each piece of content, such as social media posts, that they are evaluating for display. A heterogeneity score component 306 acts to compute a heterogeneity score for each such piece of content. In that manner, any of the feed component 300, event component 302, or group component 304 could transmit a piece of content, such as a social media post, to the heterogeneity score component 306 to obtain a heterogeneity score for the piece of content that it could then use in determining whether or not to display that piece of content.

The heterogeneity score is a score indicating the heterogeneity of member profiles of members who have engaged with the piece of content. Engagement of a piece of content in the realm of social networking services involves some sort of user interface interaction by a member with the piece of content. Examples include saving, favoriting, sharing, liking, etc.

In computing a heterogeneity score for a piece of content, member profiles for each member who has interacted with the piece of content may be obtained and attributes contained in those member profiles may be extracted. In one example embodiment, the attributes utilized are skills (i.e., skills of the member) and titles (i.e., job title of the member). These attributes are only examples, however, and other embodiments are possible where other attributes from the member profiles are used in conjunction with, or in lieu of, these attributes. It should be noted that the attributes selected for inclusion for computation of the heterogeneity score may vary based on the context. For example, one set of attributes may be used in computing the heterogeneity scores of posts for social media feeds while another set of attributes may be used for computing the heterogeneity score of posts for groups.

Figure 4:
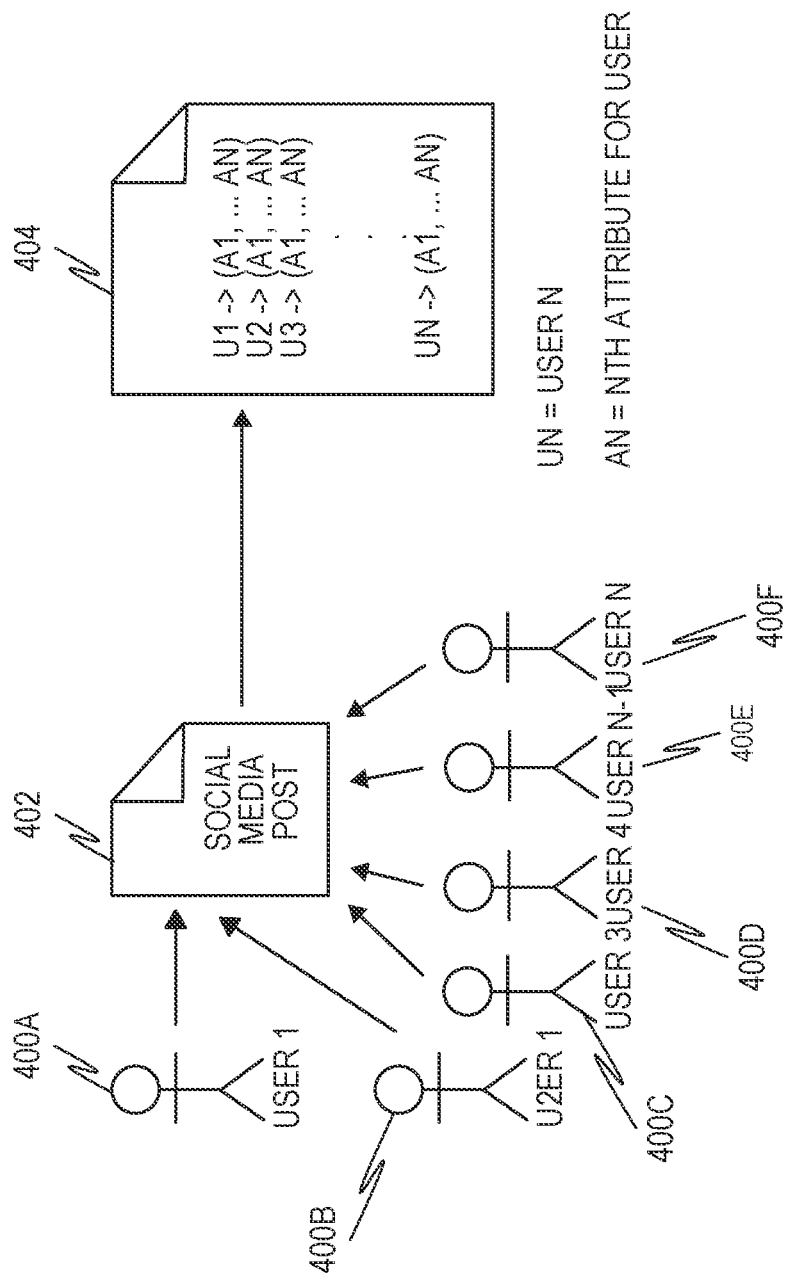
FIG. 4 is a diagram illustrating aggregation of attributes of members interacting with a social media post in accordance with an example embodiment.

FIG. 4 is a diagram illustrating aggregation of attributes of members 400A-400F interacting with a social media post 402, in accordance with an example embodiment. Here, there are six members 400A-400F who have interacted with the social media post 402, and attributes of all six of these members 400A-400F are aggregated and stored in document 404.

In an example embodiment, the heterogeneity score component 306 calculates a heterogeneity score based on a Shannon heterogeneity index. Specifically, the Shannon entropy quantifies the uncertainty (entropy or degree of surprise) associated with a prediction. The index is designed as the weighted sum of relative entropy (E(w)) and is defined as the sum of the relative entropy of each attribute type weighted by its relative importance among attributes, or:

$$E_{wd} = -\sum_{a=1}^{A}\sum_{j=1}^{C_a} w_a p(c_{ai}|d)\ln p(c_{ai}|d) \quad (1)$$

$$\sum_{a=1}^{A} w_a = 1$$

$$p(c_{ai}|d) = \frac{n_{d,c_{ai}}}{n_d} \quad (2)$$

where $n_{d,c_{ni}}$ = count of words belonging to cluster $c_{ai}$ in post $d$ $n_d$ = total count of words in post $d$ where $p(c_{ai}|d)$ is the proportion of attributes belonging to the ith type of cluster in the post of interest. $p_i$ is often the proportion of individuals belonging to the ith species in the dataset of interest. The more unequal the abundances of the types, the larger the weighted geometric mean of the $p_i$ values, and the smaller the corresponding Shannon entropy. If practically all abundance is concentrated to one type, and the other types are very rare (even if there are many of them), Shannon entropy approaches zero. When there is only one type in the dataset, Shannon entropy exactly equals zero.

A heterogeneity score $D_d$ for a given post d can then be defined as:

$$D_d = \sum_{a=1}^{A}\sum_{i=1}^{C_a}\sum_{j=1}^{C_a} p(c_{ai}|d)\ p(c_{aj}|d)\ \partial(c_{ai},c_{aj}) \quad (3)$$

where $A$ = number of Attributes $C_a$ = number of Clusters of attribute $a$ $d$ = post $\partial(c_i,c_j)$ = distance between cluster centres $c_{ai}$ and $c_{aj}$ \quad (4)

The clusters for each attribute may be created independently from the post. These can be created using, for example, word2vec embeddings or any other representation for attributes and applying one or more clustering techniques to the embedded points. Embedding generally involves taking attribute values and mapping combinations of different attributes and their corresponding attribute values to particular points in an n-dimensional graph.

In an example embodiment, k-means clustering may be used to cluster 100 dimension embeddings for each value of attributes (examples including skills and titles). A threshold may then be applied on the final score and high scoring posts are filtered out. The threshold value may be tuned on a large set of posts to filter maximum low quality posts.

Through the above calculations, the probabilities $p_i$ indicate the probability that a given piece of content will correspond to a particular cluster of user attributes. In an example embodiment, these probabilities may then be reused by a topic modeling component 308 to determine the likelihood that a piece of content relates to a particular topic associated with the cluster. Specifically, for each of the clusters identified by the heterogeneity score component 306, the topic modeling component 308 can rank their respective probability scores (as calculated by the heterogeneity score component 306), which then produces a list of topics by importance to the piece of content (the topics based on the underlying attribute values in each cluster). Thus, for example, a list may be produced that a particular social media post 402 has a high probability of being associated with a cluster that includes members having the skill "Java programming", followed by a demi-high probability of being associated with a cluster that includes members having the skill "C++ programming" and so on. This list of relevant topics to the post can then be used to associate the post with various topics in various contexts. For example, the groups component 304 may utilize this list in determining whether the social media post 402 is appropriate to be posted in a group devoted to "Java programming."

Figure 5:
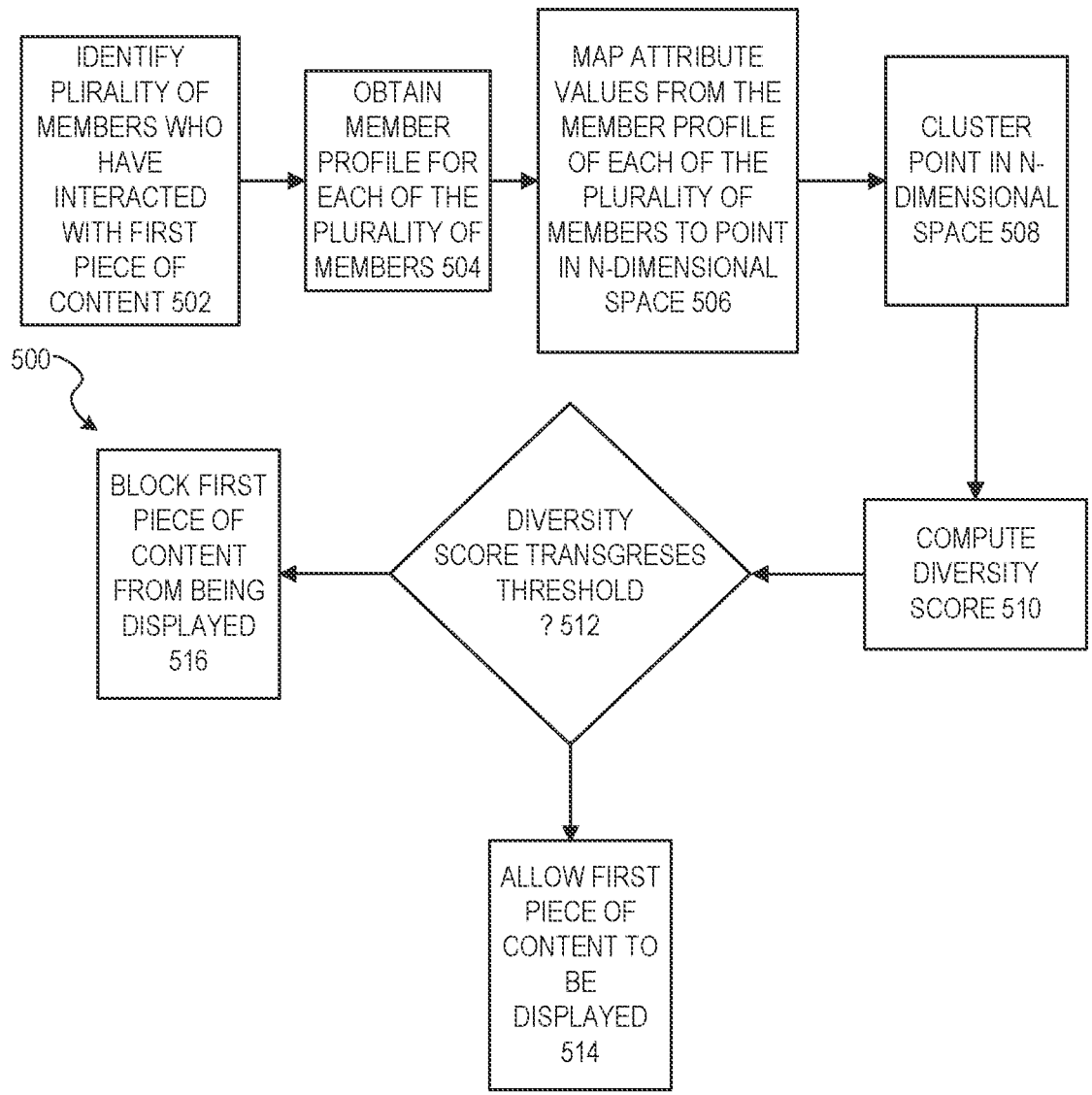
FIG. 5 is a flow diagram illustrating a method for determining whether to display a piece of content in a graphical user interface of an online network, in accordance with an example embodiment.

FIG. 5 is a flow diagram illustrating a method 500 for determining whether to display a piece of content in a graphical user interface of an online network, in accordance with an example embodiment. At operation 502, a plurality of members of the online network who have interacted, via the graphical user interface, with a first piece of content are identified. At operation 504, for each of the plurality of members, a member profile containing attribute values for one or more attributes is obtained.

At operation 506, for each of the plurality of members and for each attribute, attribute values contained in the member profile corresponding to the member are mapped into a point in an n-dimensional space. At operation 508, the points in the n-dimensional space are clustered into one or more clusters. In an example embodiment, a k-means clustering algorithm is used with a 100-dimensional space.

At operation 510, a heterogeneity score is computed for the first piece of content, the heterogeneity score inversely related to a number of clusters in the one or more clusters to which the first piece of content relates. The first piece of content relates to a cluster if the cluster contains attribute values that match text in or associated with the first piece of content.

At operation 512, the heterogeneity score is compared to a preset heterogeneity score threshold. If the heterogeneity score transgresses the threshold, then at operation 514 the first piece of content is eligible to be displayed. If not, then at operation 516 the first piece of content is blocked from being displayed.

Figure 6:
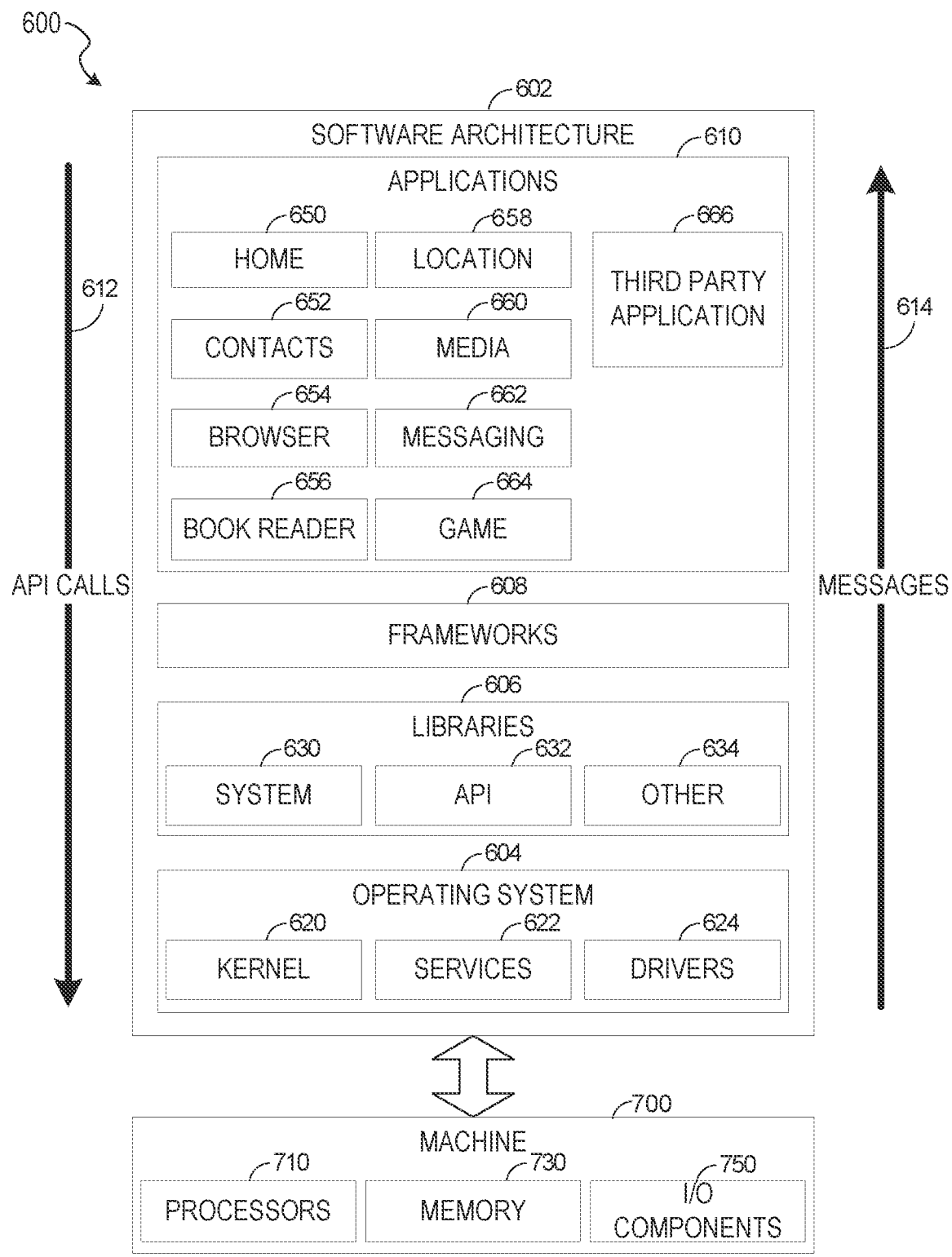
FIG. 6 is a block diagram illustrating a software architecture, in accordance with an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
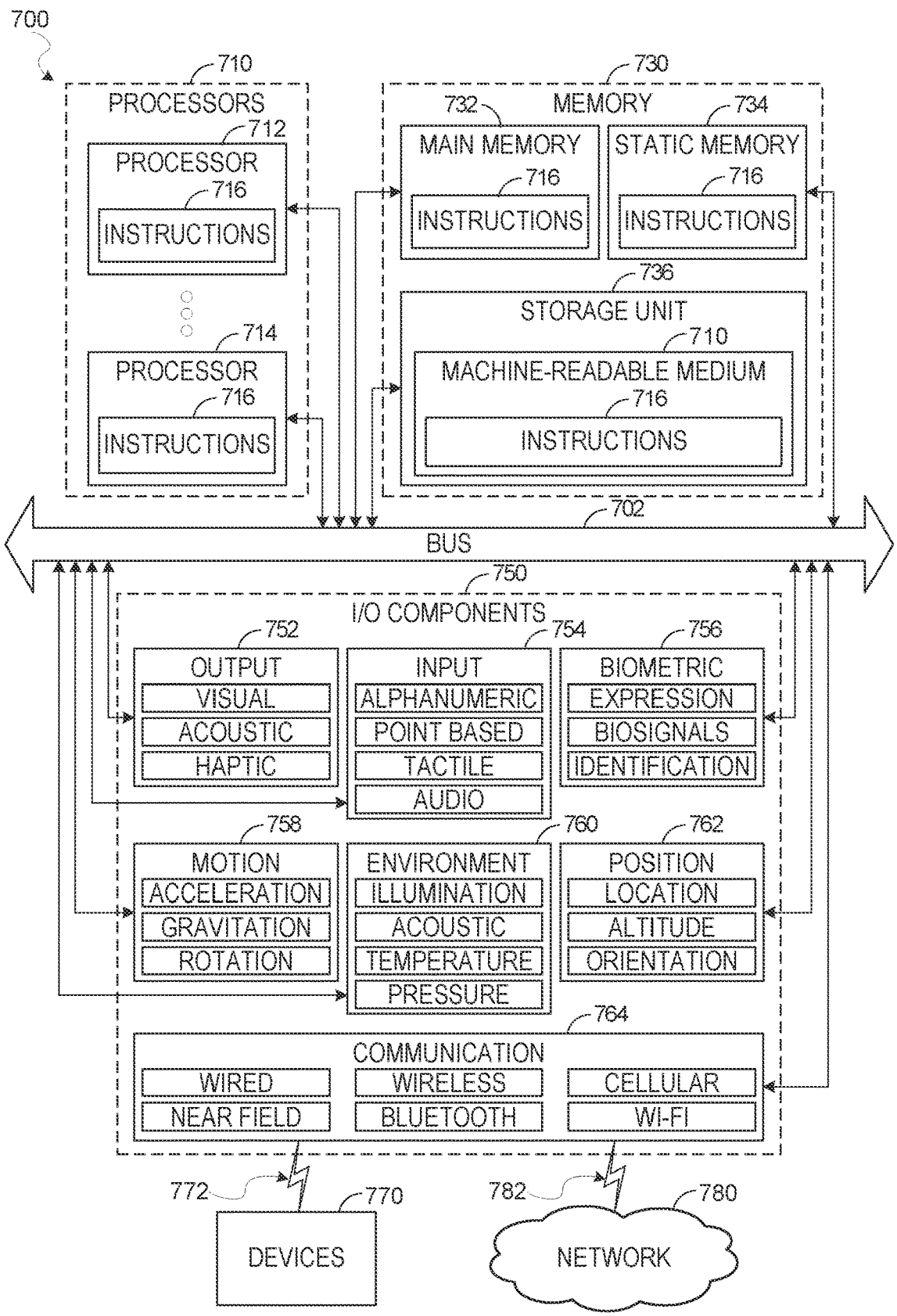
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein may be executed. For example, the instructions 716 may cause the machine 700 to execute the method 500 of FIG. 5. Additionally, or alternatively, the instructions 716 may implement FIGS. 1-5, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors 712 (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor), multiple processors 710 with a single core, multiple processors 710 with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to the processors 710. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
a computer-readable medium having instructions stored thereon, which, when executed by a processor, cause the system to perform operations comprising:
identifying, in an online network, a plurality of members of the online network who have interacted, via a graphical user interface, with a first piece of content;
obtaining, for each of the plurality of members, a member profile containing attribute values for one or more attributes;
mapping, for each of the plurality of members and for each attribute, attribute values contained in the member profile corresponding to the member, into a point in an n-dimensional space;
clustering the points in the n-dimensional space into one or more clusters;
computing a heterogeneity score for the first piece of content, the heterogeneity score inversely related to a number of clusters in the one or more clusters to which the first piece of content relates;
comparing the heterogeneity score to a preset heterogeneity score threshold; and
in response to a determination that the heterogeneity score does not transgress the preset heterogeneity score threshold, preventing the first piece of content from being displayed to a user.

2. The system of claim 1, wherein the first piece of content relates to a cluster if the cluster contains attribute values that match text in or associated with the first piece of content.

3. The system of claim 1, wherein the clustering is performed using a k-means clustering algorithm.

4. The system of claim 1, wherein the mapping uses a 100-dimensional space.

5. The system of claim 1, wherein the attributes include skills and titles.

6. The system of claim 5, wherein the attributes further include location.

7. The system of claim 1, wherein the computing a heterogeneity score includes, for each of the one or more clusters, determining whether the first piece of content relates to the cluster, and wherein the operations further comprise using the determination as to whether the first piece of content relates to the cluster to, for at least one cluster, infer a topic associated with the cluster based on text in or associated with the first piece of content.

8. A computerized method comprising:
identifying, in an online network, a plurality of members of the online network who have interacted, via a graphical user interface, with a first piece of content;
obtaining, for each of the plurality of members, a member profile containing attribute values for one or more attributes;
mapping, for each of the plurality of members and for each attribute, attribute values contained in the member profile corresponding to the member, into a point in an n-dimensional space;
clustering the points in the n-dimensional space into one or more clusters;
computing a heterogeneity score for the first piece of content, the heterogeneity score inversely related to a number of clusters in the one or more clusters to which the first piece of content relates;

comparing the heterogeneity score to a preset heterogeneity score threshold; and in response to a determination that the heterogeneity score does not transgress the preset heterogeneity score threshold, preventing the first piece of content from being displayed to a user.

9. The method of claim 8, wherein the first piece of content relates to a cluster if the cluster contains attribute values that match text in or associated with the first piece of content.

10. The method of claim 8, wherein the clustering is performed using a k-means clustering algorithm.

11. The method of claim 8, wherein the mapping uses a 100-dimensional space.

12. The method of claim 8, wherein the attributes include skills and titles.

13. The method of claim 12, wherein the attributes further include location.

14. The method of claim 8, wherein the computing a heterogeneity score includes, for each of the one or more clusters, determining whether the first piece of content relates to the cluster, and wherein the method further comprises using the determination as to whether the first piece of content relates to the cluster to, for at least one cluster, infer a topic associated with the cluster based on text in or associated with the first piece of content.

15. A non-transitory machine-readable storage medium comprising instructions which, when implemented by one or more machines, cause the one or more machines to perform operations comprising:

identifying, in an online network, a plurality of members of the online network who have interacted, via a graphical user interface, with a first piece of content;

obtaining, for each of the plurality of members, a member profile containing attribute values for one or more attributes;

mapping, for each of the plurality of members and for each attribute, attribute values contained in the member profile corresponding to the member, into a point in an n-dimensional space;

clustering the points in the n-dimensional space into one or more clusters;

computing a heterogeneity score for the first piece of content, the heterogeneity score inversely related to a number of clusters in the one or more clusters to which the first piece of content relates;

comparing the heterogeneity score to a preset heterogeneity score threshold; and in response to a determination that the heterogeneity score does not transgress the preset heterogeneity score threshold, preventing the first piece of content from being displayed to a user.

16. The non-transitory machine-readable storage medium of claim 15, wherein the first piece of content relates to a cluster if the cluster contains attribute values that match text in or associated with the first piece of content.

17. The non-transitory machine-readable storage medium of claim 15, wherein the clustering is performed using a k-means clustering algorithm.

18. The non-transitory machine-readable storage medium of claim 15, wherein the mapping uses a 100-dimensional space.

19. The non-transitory machine-readable storage medium of claim 15, wherein the attributes include skills and titles.

20. The non-transitory machine-readable storage medium of claim 19, wherein the attributes further include location.

* * * * *